United States Patent
Gangadharappa et al.

(10) Patent No.: US 10,379,966 B2
(45) Date of Patent: Aug. 13, 2019

(54) SYSTEMS AND METHODS FOR SERVICE REPLICATION, VALIDATION, AND RECOVERY IN CLOUD-BASED SYSTEMS

(71) Applicant: Zscaler, Inc., San Jose, CA (US)

(72) Inventors: Tejus Gangadharappa, Milpitas, CA (US); Wai Leung Chan, San Jose, CA (US); Dinoja Padmanabhan, San Jose, CA (US); Sivaprasad Udupa, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 0 days.

(21) Appl. No.: 15/813,295

(22) Filed: Nov. 15, 2017

(65) Prior Publication Data

US 2019/0146884 A1 May 16, 2019

(51) Int. Cl.
| | | |
|---|---|---|
| *G06F 12/00* | (2006.01) | |
| *G06F 11/14* | (2006.01) | |
| *G06F 3/06* | (2006.01) | |
| G06F 13/00 | (2006.01) | |
| G06F 13/28 | (2006.01) | |

(52) U.S. Cl.
CPC .......... *G06F 11/1464* (2013.01); *G06F 3/065* (2013.01); *G06F 11/1469* (2013.01); *G06F 3/067* (2013.01); *G06F 3/0619* (2013.01); *G06F 11/1451* (2013.01)

(58) Field of Classification Search
CPC .... G06F 11/1464; G06F 3/065; G06F 3/0619; G06F 3/067; G06F 11/1469; G06F 11/1451
See application file for complete search history.

(56) References Cited

U.S. PATENT DOCUMENTS

| | | | | |
|---|---|---|---|---|
| 5,668,991 A | * | 9/1997 | Dunn | ............... G06F 17/30371 |
| 6,823,474 B2 | * | 11/2004 | Kampe | ............... G06F 11/1464 |
| | | | | 714/13 |
| 7,032,089 B1 | * | 4/2006 | Ranade | ............... G06F 11/2069 |
| | | | | 711/161 |
| 7,191,299 B1 | * | 3/2007 | Kekre | ................ G06F 11/2074 |
| | | | | 707/999.202 |

(Continued)

OTHER PUBLICATIONS

Galdino, "A brief overview of the Raft algorithm", Jul. 11, 2016, github.com/carlosgaldino, pp. 1-13.

(Continued)

*Primary Examiner* — Mark A Giardino, Jr.
(74) *Attorney, Agent, or Firm* — Clements Bernard Walker PLLC; Lawrence A. Baratta, Jr.

(57) ABSTRACT

Systems and methods for replication and validation between a plurality of nodes in a cloud-based system forming a cluster include replicating a database and a software state between the plurality of nodes utilizing a replication algorithm which elects a master of the plurality of nodes and remaining nodes comprising peers, wherein the master is configured to perform the replicating; validating database sequences in the database at all of the plurality of nodes utilizing the replication algorithm to ensure sequential order of the validating between the plurality of nodes; and, responsive to differences between a peer and the master, performing a failure recovery in the database at the peer.

18 Claims, 10 Drawing Sheets

(56) References Cited

U.S. PATENT DOCUMENTS

| | | | | |
|---|---|---|---|---|
| 8,572,031 B2* | 10/2013 | Merriman | ......... | G06F 17/30578 |
| | | | | 707/613 |
| RE45,959 E * | 3/2016 | McCord | .............. | H04L 65/1096 |
| 2006/0010441 A1* | 1/2006 | Jahn | ........................ | H04J 14/02 |
| | | | | 718/100 |
| 2006/0047626 A1* | 3/2006 | Raheem | .............. | G06F 11/1469 |
| 2017/0366619 A1* | 12/2017 | Schreter | ................ | H04L 67/145 |

OTHER PUBLICATIONS

Ongaro et al., "In Search of an Understandable Consensus Algorithm (Extended Version)", Stanford University, pp. 1-18.

* cited by examiner

SYSTEMS AND METHODS FOR SERVICE REPLICATION, VALIDATION, AND RECOVERY IN CLOUD-BASED SYSTEMS

FIELD OF THE DISCLOSURE

The present disclosure generally relates to computer and networking systems and methods. More particularly, the present disclosure relates to systems and methods for service replication, validation, and recovery in cloud-based systems.

BACKGROUND OF THE DISCLOSURE

Cloud-based systems are proliferating with providers using cloud computing to offer services. A cloud-based system includes a plurality of servers interconnected to one another, including servers in different, geographically diverse data centers. As a cloud-based system can be spread globally, there is a need for system replication and coordination. System replication includes distribution of files, databases, objects, etc. between different nodes, servers, clusters, etc. Subsequent to system replication, there is a need for validation and possibly recovery due to failures and/or errors in the system replication. Paxos, Raft, and ZooKeeper are examples of conventional techniques in system replication and coordination. Paxos is a family of protocols for guaranteeing consistency across a group unreliable of replicas. The protocol attempts to make progress even during periods when some replicas are unresponsive. Raft is a consensus algorithm designed as an alternative to Paxos. It was meant to be more understandable than Paxos by means of separation of logic, but it is also formally proven safe and offers some additional features. Raft offers a generic way to distribute a state machine across a cluster of computing systems, ensuring that each node in the cluster agrees upon the same series of state transitions. ZooKeeper is a distributed, open-source coordination service for distributed applications. It exposes a simple set of primitives that distributed applications can build upon to implement higher level services for synchronization, configuration maintenance, and groups and naming. While these approaches provide replication and coordination, there is a need for additional fault-tolerance and recovery in terms of in-service cloud-based systems.

BRIEF SUMMARY OF THE DISCLOSURE

In an exemplary embodiment, a method of replication and validation between a plurality of nodes in a cloud-based system forming a cluster includes replicating a database and a software state between the plurality of nodes utilizing a replication algorithm which elects a master of the plurality of nodes and remaining nodes as peers, wherein the master is configured to perform the replicating; validating database sequences in the database at all of the plurality of nodes utilizing the replication algorithm to ensure sequential order of the validating between the plurality of nodes; and, responsive to differences between a peer and the master, performing a failure recovery in the database at the peer. The method can further include verifying the database of a peer and the master utilizing the replication algorithm without closing an application interacting with the database and honoring requests from the application to the database during the verifying. The verifying can be performed through a replication operation through the replication algorithm to perform a database dump which is verified offline with a tool for comparison. The comparison can omit one or more fields in the database between the peer and the master, wherein the one or more fields are inherently different. The validating can be performed after each database update. The validating can include causing each node to determine a checksum of all sequence values by the master; providing the master's checksum to each node via the replication algorithm; and comparing the master's checksum with a local checksum at each node. The validating can be performed through commands in the replication algorithm ensuring a sequential order of operations. The failure recovery can include obtaining a full dump from the master. The replication algorithm can include Raft.

In another exemplary embodiment, a cloud-based system configured for replication and validation between a plurality of nodes in a cluster includes a plurality of nodes each configured to replicate a database and a software state between one another utilizing a replication algorithm which elects a master of the plurality of nodes and remaining nodes as peers, wherein the master is configured to perform replication; wherein each of the plurality of nodes is configured to validate database sequences utilizing the replication algorithm to ensure sequential order of the validation between the plurality of nodes, and wherein, responsive to differences between a peer and the master in the validation, a failure recovery is performed for the database at the peer. The database of a peer and the master can be verified utilizing the replication algorithm without closing an application interacting with the database and while honoring requests from the application to the database during the verification. The verification can be performed through a replication operation through the replication algorithm to perform a database dump which is verified offline with a tool for comparison. The comparison can omit one or more fields in the database between the peer and the master, wherein the one or more fields are inherently different. The validation can be performed after each database update. The validation can include a determination of a checksum of all sequence values at each node; each node obtaining the master's checksum via the replication algorithm; and each node comparing the master's checksum with a local checksum. The validation can be performed through commands in the replication algorithm ensuring a sequential order of operations. The failure recovery can include obtaining a full dump from the master. The replication algorithm can include Raft.

In a further exemplary embodiment, a non-transitory computer-readable medium including instructions that, when executed, cause a processor to perform steps of: replicating a database and a software state between the plurality of nodes utilizing a replication algorithm which elects a master of the plurality of nodes and remaining nodes as peers, wherein the master is configured to perform the replicating; validating database sequences in the database at all of the plurality of nodes utilizing the replication algorithm to ensure sequential order of the validating between the plurality of nodes; and, responsive to differences between a peer and the master, performing a failure recovery in the database at the peer. The non-transitory computer-readable medium can include instructions that, when executed, further cause the processor to perform steps of verifying the database of a peer and the master utilizing the replication algorithm without closing an application interacting with the database and honoring requests from the application to the database during the verifying.

BRIEF DESCRIPTION OF THE DRAWINGS

The present disclosure is illustrated and described herein with reference to the various drawings, in which like reference numbers are used to denote like system components/ method steps, as appropriate, and in which:

FIG. 3 is a block diagram of a mobile device, which may be used in the cloud-based system of FIG. 1 or the like;

DETAILED DESCRIPTION OF THE DISCLOSURE

In various exemplary embodiments, the present disclosure relates to systems and methods for service replication, validation, and recovery in cloud-based systems. The systems and methods build upon the framework of Paxos, Raft, and ZooKeeper to perform replication, system validation for the correctness of the replication, and system recovery in the event a validation check has failures and/or other protocol implementation issues. The systems and methods perform distributed database and software state replication using a protocol similar to Raft. The systems and methods can identify a set of healthy nodes and the leader of this set in a cluster of servers that are following the replication algorithm. The systems and methods can discover nodes that are participating in the replication algorithm and continuously validate the integrity of the replicated database sequences using the replication and database difference detection at run-time in a replicated database. The systems and methods validate the integrity of sequences in a replicated database and ensure database validation in a distributed cloud service environment. The systems and methods can provide failure recovery using Postgres WAL archiving and Raft log extraction techniques.

Exemplary Cloud System Architecture

Figure 1:
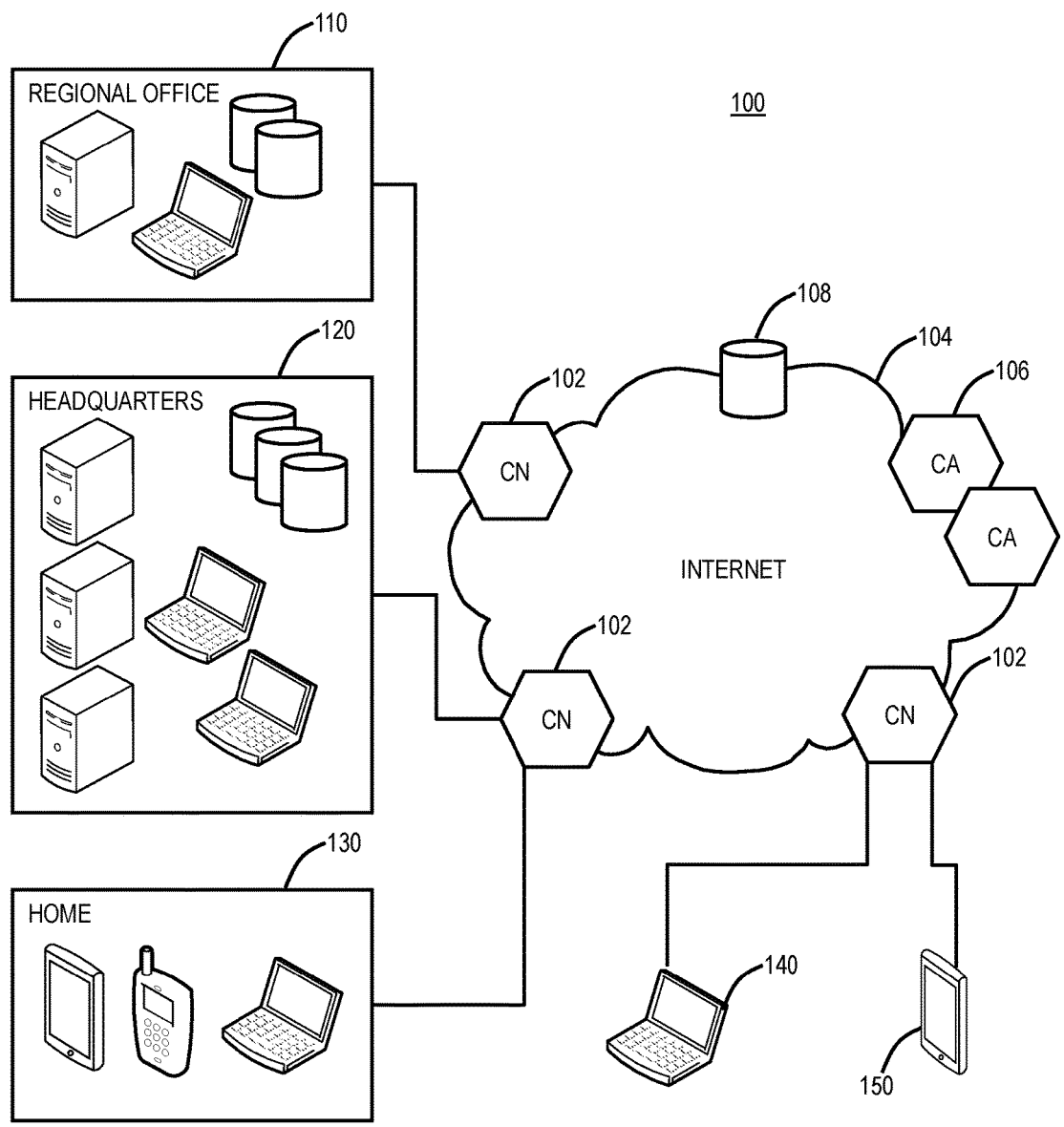
FIG. 1 is a network diagram of a cloud-based system for implementing various cloud-based service functions.
Figure 2:
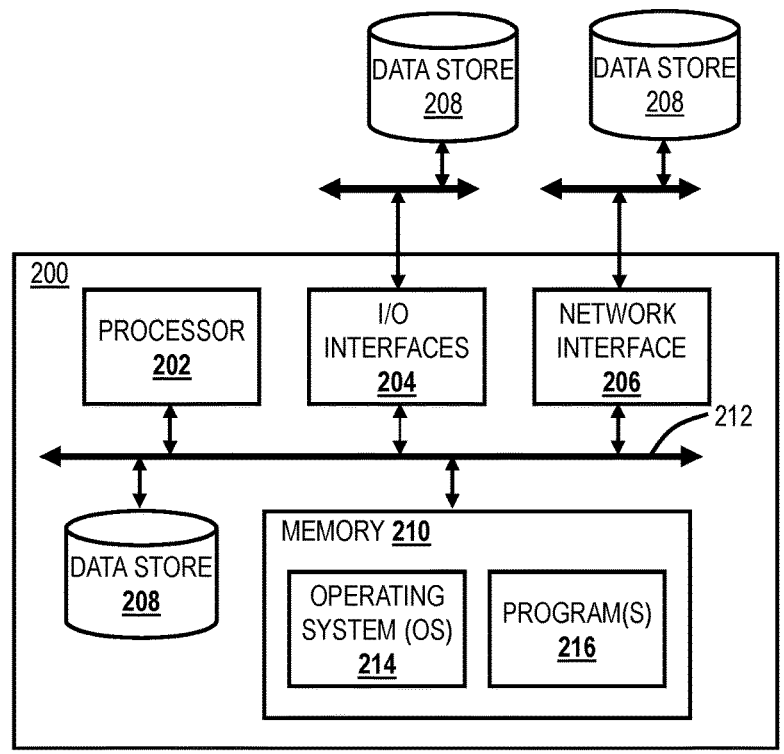
FIG. 2 is a block diagram of a server which may be used in the cloud-based system of FIG. 1, in other systems, or stand-alone.

FIG. 1 is a network diagram of a cloud-based system 100 for implementing various cloud-based service functions. The cloud-based system 100 includes one or more cloud nodes (CN) 102 communicatively coupled to the Internet 104 or the like. Also, the cloud-based system 100 can also include one or more Central Authorities (CA) 106 and one or more log nodes 108, and each of the components 102, 106, 108 can be communicatively coupled to one another via the Internet 104. The cloud nodes 102, the central authorities 106, and the log nodes 108 may be implemented as a server 200 (as illustrated in FIG. 2), or the like, and can be geographically diverse from one another such as located at various data centers around the country or globe. For illustration purposes, the cloud-based system 100 can connect to a regional office 110, headquarters 120, various employee's homes 130, laptops/desktops 140, and mobile devices 150 each of which can be communicatively coupled to one of the cloud nodes 102 via the Internet 104. These locations 110, 120, 130 and devices 140, 150 are shown for illustrative purposes, and those skilled in the art will recognize there are various access scenarios to the cloud-based system 100 all of which are contemplated herein.

Cloud computing systems and methods abstract away physical servers, storage, networking, etc. and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase SaaS is sometimes used to describe application programs offered through cloud computing. A common shorthand for a provided cloud computing service (or even an aggregation of all existing cloud services) is "the cloud." The cloud-based system 100 is illustrated herein as one exemplary embodiment of a cloud-based system, and those of ordinary skill in the art will recognize the systems and methods described herein contemplate operation with any cloud-based system.

Again, the cloud-based system 100 can provide any functionality through services such as software as a service, platform as a service, infrastructure as a service, security as a service, Virtual Network Functions (VNFs) in a Network Functions Virtualization (NFV) Infrastructure (NFVI), etc. to the locations 110, 120, 130 and devices 140, 150. The cloud-based system 100 is replacing the conventional deployment model where network devices are physically managed and cabled together in sequence to deliver the various services associated with the network devices. The cloud-based system 100 can be used to implement these services in the cloud without end users requiring the physical devices and management thereof. The cloud-based system 100 can provide services via VNFs (e.g., firewalls, Deep Packet Inspection (DPI), Network Address Translation (NAT), etc.). VNFs take the responsibility of handling specific network functions that run on one or more virtual machines (VMs), software containers, etc., on top of the hardware networking infrastructure—routers, switches, etc. Individual VNFs can be connected or combined together as building blocks in a service chain to offer a full-scale networking communication service. The cloud-based system 100 can provide other services in addition to VNFs, such as X-as-a-Service (XaaS) where X is security, access, etc.

In an exemplary embodiment, the cloud-based system 100 can be a distributed security system or the like. Here, in the cloud-based system 100, traffic from various locations (and various devices located therein) such as the regional office 110, the headquarters 120, various employee's homes 130, laptops/desktops 140, and mobile devices 150 can be monitored or redirected to the cloud through the cloud nodes 102. That is, each of the locations 110, 120, 130, 140, 150 is communicatively coupled to the Internet 104 and can be monitored by the cloud nodes 102. The cloud-based system 100 may be configured to perform various functions such as spam filtering, uniform resource locator (URL) filtering, antivirus protection, malware detection, bandwidth control, Data Leakage Prevention (DLP), zero-day vulnerability protection, web 2.0 features, and the like. In an exemplary embodiment, the cloud-based system 100 may be viewed as Security-as-a-Service through the cloud, such as the IA.

In an exemplary embodiment, the cloud-based system 100 can be configured to provide mobile device security and policy systems and methods. The mobile device 150 may be similar to the server 200 (as illustrated in FIG. 2) and may include common devices such as laptops, smartphones, tablets, netbooks, personal digital assistants, MP3 players, cell phones, e-book readers, and the like. The cloud-based system 100 is configured to provide security and policy enforcement for devices including the mobile devices 150 in the cloud. Advantageously, the cloud-based system 100, when operating as a distributed security system, avoids platform-specific security apps on the mobile devices 150, forwards web traffic through the cloud-based system 100, enables network administrators to define policies in the cloud, and enforces/cleans traffic in the cloud prior to delivery to the mobile devices 150. Further, through the cloud-based system 100, network administrators may define user-centric policies tied to users, not devices, with the policies being applied regardless of the device used by the user. The cloud-based system 100 provides 24×7 security with no need for updates as the cloud-based system 100 is always up-to-date with current threats and without requiring device signature updates. Also, the cloud-based system 100 enables multiple enforcement points, centralized provisioning, and logging, automatic traffic routing to the nearest cloud node 102, geographical distribution of the cloud nodes 102, policy shadowing of users which is dynamically available at the cloud nodes 102, etc.

As a cloud-based security system, the cloud-based system 100 has a distributed network, multi-tenant architecture. The cloud-based system 10 is configured to examine traffic over all ports and protocols including SSL encrypted traffic. The policies are configured to follow the user, regardless of their location or device. The cloud-based system 100 can provide security functionality combining findings from various different approaches to deliver a holistic perspective. The cloud-based system 100 can be capable of recognizing threats independent of signature feeds, and the cloud-based system 100 can propagate threat information across the cloud in real-time, i.e., zero-day or zero-hour determinations such as between the cloud nodes 102 and the central authority 106.

The objective of the cloud-based system as a cloud-based security system is a multi-tenant (multiple users, companies, etc. on the same platform) and highly scalable system through functionally distributes components of a standard proxy to create a giant global network that acts as a single virtual proxy. The user can go to any gateway (cloud node 102) at any time for policy-based secure Internet access. Two exemplary services for the cloud-based system 100 can include Zscaler Internet Access (which can generally be referred to as Internet Access (IA)) and Zscaler Private Access (which can generally be referred to as Private Access (PA)), from Zscaler, Inc. (the assignee of the present application). The IA service can include firewall, threat prevention, Deep Packet Inspection (DPI), DLP, and the like. The PA can include access control, micro service segmentation, etc. For example, the IA service can provide a user with Internet Access and the PA service can provide a user with access to enterprise resources in lieu of traditional Virtual Private Networks (VPNs).

The central authority 106 is a supervisory management node, i.e., the "brains" of the cloud-based security system. The central authority 106 manages and monitors all cloud nodes 102 and ensures that they are always up-to-date with the latest real-time feeds and software and that they are synchronized to propagate threat intelligence cloud-wide. The central authority 106 directs users to the closest cloud node 102, ensuring that policy follows the user with minimum latency. The central authorities 106 are a globally distributed peer-to-peer cluster with an automatically elected master. This ensures all cloud components can always talk to a central authority 106 even if there are major Internet 104 outages that isolate an entire region. Through its multi-tenant architecture, the central authority 106 provides each organization with its own secure portal to administer policy. Any change to the policy is communicated to the cloud nodes 102 within seconds. The central authority 106 provides an end-user authentication framework through integration with Secure Lightweight Directory Access Protocol (LDAP) or ID Federation systems.

The cloud nodes 102 are configured to interface traffic with the users, e.g., the locations 110, 120, 130 and devices 140, 150. The cloud nodes 102 are configured to perform security, management, and compliance policies for the users, with the policies served by the central authority 106. The cloud nodes 102 can be an inline proxy that enforces policies on a user-level granularity. The cloud nodes 102 can scan every byte of a request, content, responses, and all related data for inline blocking of threats like viruses, cross-site scripting (XSS), and botnets. This capability also enables Dynamic Content Classification (DCC) of unknown sites. By scanning each page, the cloud nodes 102 can determine a risk index for every page loaded that enables administrators to control content served to their users based on acceptable risk. The cloud nodes 102 can include authentication and policy distribution mechanisms that enables any user to connect to any cloud node 102 at any time enabling enterprises to simply point traffic to any cloud node 102 to ensure full policy enforcement while getting all reports back in real-time.

The log nodes 108 can be integrated with the cloud nodes 102 or separate. The log nodes 108 are configured to maintain logs of all user transactions, in a compressed manner. The logs can be transmitted every second to the log nodes 108 over secure connections from the cloud nodes 102, as well as a multicast to multiple servers for redundancy. The log nodes 108 provide an administrator with real-time reports and the capability to query complete transaction-level details for any user, department, or location at any time in seconds. Data privacy and security are fundamental to any multi-tenant architecture. The cloud-based security system can provide privacy protection at a transaction level by avoiding any storage of transaction content. For example, transaction content is never written to disk but takes place in memory. The log nodes 108 can store and transfer logs in an encrypted format.

Exemplary Server Architecture

FIG. 2 is a block diagram of a server 200 which may be used in the cloud-based system 100, in other systems, or standalone. For example, the cloud nodes 102, the central authority 106, and/or the log nodes 108 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the server 200, a semiconductor-based microprocessor (in the form of a microchip or chip set), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components. User input may be provided via, for example, a keyboard, touchpad, and/or a mouse. System output may be provided via a display device and a printer (not shown). I/O interfaces 204 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 206 may be used to enable the server 200 to communicate on a network, such as the Internet 104. The network interface 206 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200 such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Exemplary Mobile Device Architecture

Figure 3:
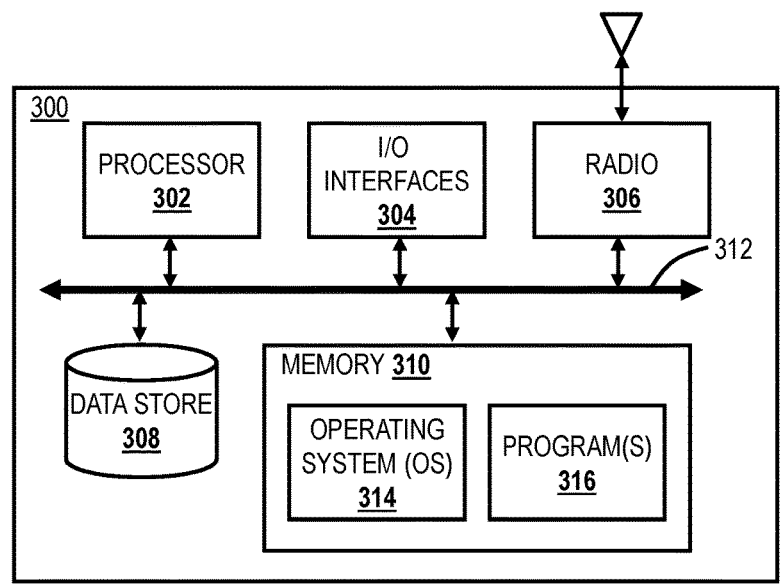

FIG. 3 is a block diagram of a mobile device 300, which may be used in the cloud-based system 100 or the like. The mobile device 300 can be a digital device that, in terms of hardware architecture, generally includes a processor 302, input/output (I/O) interfaces 304, a radio 306, a data store 308, and memory 310. It should be appreciated by those of ordinary skill in the art that FIG. 3 depicts the mobile device 310 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the mobile device 300, a semiconductor-based microprocessor (in the form of a microchip or chip set), or generally any device for executing software instructions. When the mobile device 300 is in operation, the processor 302 is configured to execute software stored within the memory 310, to communicate data to and from the memory 310, and to generally control operations of the mobile device 300 pursuant to the software instructions. In an exemplary embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 304 can also include, for example, a serial port, a parallel port, a small computer system interface (SCSI), an infrared (IR) interface, a radio frequency (RF) interface, a universal serial bus (USB) interface, and the like. The I/O interfaces 304 can include a graphical user interface (GUI) that enables a user to interact with the mobile device 310. Additionally, the I/O interfaces 304 may further include an imaging device, i.e., camera, video camera, etc.

The radio 306 enables wireless communication to an external access device or network. Any number of suitable wireless data communication protocols, techniques, or methodologies can be supported by the radio 306, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; proprietary wireless data communication protocols such as variants of Wireless USB; and any other protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system (O/S) 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the mobile device 300. For example, exemplary programs 316 may include, but not limited to, a web browser, social networking applications, streaming media applications, games, mapping and location applications, electronic mail applications, financial applications, and the like. In a typical example, the end user typically uses one or more of the programs 316 along with a network such as the cloud-based system 100.

Distributed Database and Software State Replication

Again, the systems and methods provide distributed database and software state replication using a protocol similar to Raft. The systems and methods include identifying the set of healthy nodes and the leader of this set in a cluster of servers (nodes) that are following the algorithm; discovering nodes that are participating in the algorithm; continuously validating the integrity of the replicated database sequences using the algorithm; and detecting differences at run-time in a replicated database. The systems and methods provide database replication and software state replication using variants of Raft, integrity validation of sequences in a replicated database, and database difference detection at run-time in a replicated database.

Raft is a consensus algorithm that is designed to be easy to understand and is equivalent to Paxos in fault-tolerance and performance. The difference is that Raft is decomposed into relatively independent subproblems relative to Paxos, and it cleanly addresses all major pieces needed for practical systems. Consensus is a fundamental problem in fault-tolerant distributed systems. Consensus involves multiple servers agreeing on values. Once they reach a decision on a value, that decision is final. Typical consensus algorithms make progress when any majority of their servers is available; for example, a cluster of 5 servers can continue to operate even if 2 servers fail. If more servers fail, they stop making progress (but will never return an incorrect result).

Consensus typically arises in the context of replicated state machines, a general approach to building fault-tolerant systems. Each server has a state machine and a log. The state machine is the component which is made fault-tolerant, such as a hash table. It will appear to clients that they are interacting with a single, reliable state machine, even if a minority of the servers in the cluster fails. Each state machine takes as input commands from its log.

Raft achieves consensus via an elected leader. A server in a Raft cluster is either a leader or a follower and can be a candidate in the precise case of an election (i.e., the leader is unavailable). The leader is responsible for log replication to the followers. It regularly informs the followers of its existence by sending a heartbeat message. Each follower has a timeout (typically between 150 and 300 ms) in which it expects the heartbeat from the leader. The timeout is reset on receiving the heartbeat. If no heartbeat is received, the follower changes its status to the candidate and starts a leader election.

Raft implements consensus by a leader approach. The cluster has one and only one elected leader which is fully responsible for managing log replication on the other servers of the cluster. It means that the leader can decide placement of new entries and establishment of data flow between it and the other servers without consulting other servers. A leader leads until it fails or disconnects, in which case a new leader is elected.

When the existing leader fails or when the algorithm is started, a new leader needs to be elected. In this case, a new term starts in the cluster. A term is an arbitrary period of time on the server on which no new leader needs to be elected. Each term starts with a leader election. If the election is completed successfully (i.e., a single leader is elected), the term keeps going with normal operations orchestrated by the new leader. If the election is a failure, a new term starts, with a new election.

A leader election is started by a candidate server. A server becomes a candidate if it receives no communication by the leader over a period called the election timeout, so it assumes there is no acting leader anymore. It starts the election by increasing the term counter, voting for itself as the new leader, and sending a message to all other servers requesting their vote. A server will vote only once per term, on a first-come-first-served basis. If a candidate receives an AppendEntries message from another server with a term number at least as large as the candidate's current term, then its election is defeated, and the candidate changes into a follower and recognizes the leader as legitimate. If a candidate receives a majority of votes, then it becomes the new leader. If neither happens, e.g., because of a split vote, then a new term starts, and a new election begins. Raft uses randomized election timeout to ensure any split votes are resolved quickly. This should reduce the chance of a split vote because servers do not become candidates at the same time: a single server will timeout, win the election, then become a leader and send heartbeat messages to other servers before any of the followers can become candidates.

The leader is responsible for the log replication. It accepts client requests which include a command to be executed by the replicated state machines in the cluster. After being appended to the leader's log as a new entry, each of the requests is forwarded to the followers in AppendEntries messages. In case of unavailability of the followers, the leader retries AppendEntries messages indefinitely, until the log entry is eventually stored by all of the followers. Once the leader receives confirmation from the majority of its followers that the entry has been replicated, the leader updates its commit index and notifies new commit index to the followers (as periodic heart beat). Each CA is now free to apply the entry to its local state machine. It provides consistency for the logs between all the servers through the cluster, ensuring that the safety rule of Log Matching is respected.

In the case of a leader crash, the logs can be left inconsistent, with some logs from the old leader not being fully replicated through the cluster. The new leader will then handle inconsistency by forcing the followers to duplicate its own log. To do so, for each of its followers, the leader will compare its log with the log from the follower, find the last entry where they agree, then delete all the entries coming after this critical entry in the follower log and replace it with its own log entries. This mechanism will restore log consistency in a cluster subject to failures.

Raft guarantees each of these safety properties. Election safety: at most one leader can be elected in a given term. Leader Append-Only: a leader can only append new entries to its logs (it can neither overwrite nor delete entries). Log Matching: if two logs contain an entry with the same index and term, then the logs are identical in all entries up through the given index. Leader Completeness: if a log entry is committed in a given term then it will be present in the logs of the leaders since this term. State Machine Safety: if a server has applied a particular log entry to its state machine, then no other server may apply a different command for the same log. The four first rules are guaranteed by the details of the algorithm described in the previous section. The State Machine Safety is guaranteed by a restriction on the election process.

For the State Machine Safety, this rule is ensured by a simple restriction: a candidate cannot win an election unless its log contains all committed entries. In order to be elected, a candidate has to contact a majority of the cluster, and given the rules for logs to be committed, it means that every committed entry is going to be present on at least one of the servers the candidate contact.

Raft determines which of two logs (carried by two distinct servers) is more up-to-date by comparing the index term of the last entries in the logs. If the logs have last entry with different terms, then the log with the later term is more up-to-date. If the logs end with the same term, then whichever log is longer is more up-to-date. In Raft, the request from a candidate to a voter includes information about the candidate's log. If its own log is more up-to-date than the candidate's log, the voter denies its vote to the candidate. This implementation ensures the State Machine Safety rule.

If a follower crashes, AppendEntries request and vote request sent by other servers handle the failure by trying indefinitely to reach the downed server. If the server restart, the pending request will complete. If the request as already been taken into account before the failure, the restarted server just ignore it the second time.

Timing is critical in Raft to elect and maintain a steady leader over time, in order to have a perfect availability of the cluster. Stability is ensured by respecting the timing requirement of the algorithm:

$$broadcastTime \ll electionTimeout \ll \text{Mean Time Before Failure (MTBF)}$$

broadcastTime is the average time it takes a server to send a request to every server in the cluster and receive responses. It is relative to the infrastructure being used. MTBF is the average time between failures for a server. electionTimeout is the same as described in the Leader Election section. A typical number for these values can be 0.5 ms to 20 ms for broadcastTime, which implies that you set the electionTimeout somewhere between 10 ms and 500 ms. It can take several weeks or months between single server failures, which means the values are all right for a stable cluster to work Database and Software State Replication The systems and methods detect sequence mismatches. In a replicated Relational database management system (RDBMS), the multiple copies of the database records need to have the same keys. In a database like PostgreSQL, the database can auto-generate keys using database sequences. For all the nodes of the cluster to generate the same key value, the sequence state on all the nodes needs to be identical at all times. In order to achieve this level of consistency, database updates need to be replicated. These database updates are opaque to the library that performs replication (Raft), in the sense the execution of the update is not dependent on the replication itself.

In an exemplary embodiment, each node running the database application resides in a geographically distributed datacenter and the request to update the in-memory state or database state can come to any running in any datacenter. The Raft leader election protocol can be run to determine a master in the system and use the master to replicate the updates to other nodes. Raft ensures consistency of the updates in the order that it received the update and tolerates network partitions and node failures. A bare minimum setup requires at least 5 nodes to perform replication and election and can tolerate a w node failure (floor (n/2) failures tolerated considering n is an odd number).

Raft is similar to a two-phase commit protocol with several changes accommodating for election and/or network partitions/node failures. Raft requires updates to successfully write to a log on a majority of nodes in the cluster. This is the first phase of the Raft algorithm. The second phase of the protocol ensures notification to the application when a majority of nodes in the cluster received the update. The log is a finite resource, and when the update does not exist in the log, database recovery method is employed to recover the node.

The systems and methods detect deviations in sequence state in a replicated database. The process is auto-triggered by the nodes after every database update. After an update, a self-generated operation is triggered that takes a checksum (such as Message-Digest 5 (MD5) of all the sequence values in the system. This operation is replicated, and all nodes in the cluster do this operation.

Integrity Validation of the Database Sequences in a Replicated Database

Integrity validation allows for the detection of sequence mismatches. Again, in a replicated database, the multiple copies of the database records need to have the same keys. In a database like PostgreSQL, the database can auto-generate keys using database sequences. For all the nodes of the cluster to generate the same key value, the sequence state on all the nodes needs to be identical at all times.

Figure 4:
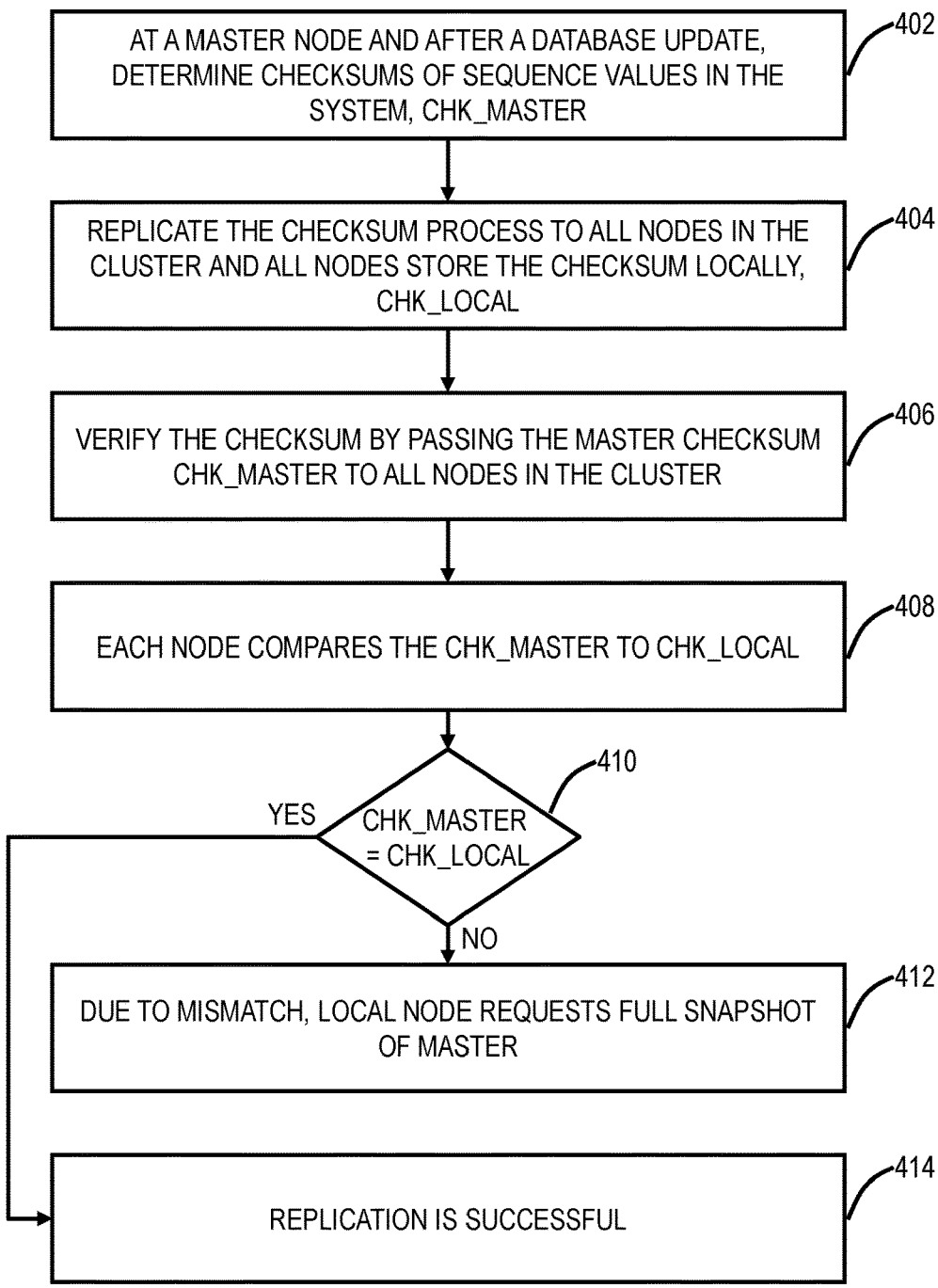
FIG. 4 is a flowchart of a process to detect deviations in sequence state in a replicated database.

FIG. 4 is a flowchart of a process 400 to detect deviations in sequence state in a replicated database. The process 400 can be automatically triggered after every database update. The process 400 includes, at a master node and after any update, determining checksums of sequence values in the master node, i.e., CHK_MASTER (step 402). Again, the checksums can be MD5 checksums. The master node replicates this checksum process to all nodes in the cluster which locally perform their checksum determination and store this value locally, i.e., CHK_LOCAL (step 404). The master node verifies the checksum of the other nodes in the cluster by passing CHK_MASTER to all nodes in the cluster (step 406) and each node in the cluster compares their CHK_LOCAL to CHK_MASTER (step 408). Note, the master node here is the node which is triggering the integrity verification via the process 400. The outcome of the process 400 is verifying node replication state with respect to the node (master node) sending its CHK_MASTER.

All nodes in the cluster compare values (step 410). Of course, on the master node CHK_LOCAL=CHK_MASTER by definition. On the other nodes, if there is a mismatch (step 410), the local node requests a full snapshot of the master node (step 412). Here, since the checksum values do not match, the local sequence state has deviated from the master node. To ensure integrity, the local node with the mismatch ensures its database is identical to the master node by requesting the full snapshot. If the checksum values match (step 410), the replication is successful, and the process 400 ends (step 414). The process 400 utilizes Raft commands for the communication, i.e., to replicate the checksum process on all nodes, to pass the CHK_MASTER value, and to request a full snapshot if needed. The process 400 works correctly as both the generation and verification are Raft operations and Raft guarantees the sequential order of these operations.

Database Difference Detection at Runtime in a Replicated Database

Figure 5:
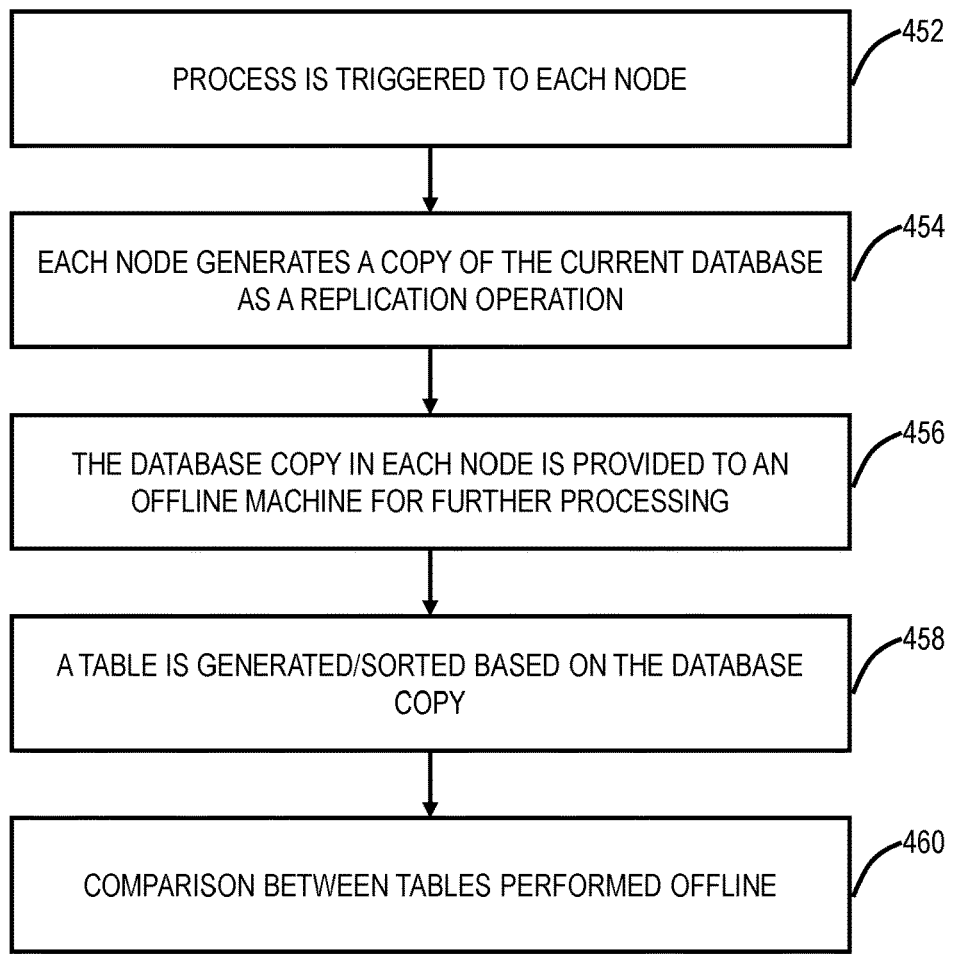
FIG. 5 is a flowchart of a process for verifying databases in a distributed system without having to close applications that interact with the databases.

FIG. 5 is a flowchart of a process 450 for verifying databases in a distributed system without having to close applications that interact with the databases. Also, requests from the applications to the database can be honored during the process 450. The process 450 uses a combination of an online and offline approach to enable verification in-service.

The process 450 is triggered to each node, such as by management (an operator, administrator, user, etc.) to indicate the desire to start the database verification process via the process 450 (step 452). In response to this, each node (e.g., the central authority node) of the distributed system starts generating a copy of the current database as a replication operation (step 454). The generation of the database dump is treated as another replicated operation, thus preserving the sequential consistency and all members of the cluster take the database copy at the same sequence ID.

The database copy in each node is provided to an offline machine for further processing (step 456). These copies are then used by offline machine(s) to load into a Database Management System (DBMS) and generate .csv (Comma Separated Value) files for each table in the database in sorted order (step 458). Another offline tool is used to compare the .csv files generated for each node against the master .cvs files generated from the master node (step 460). The master node is the node that replicates the original client requests to other nodes in the system.

For the process 450 and the following description, it is assumed the client requests that will change the state of the node can be serialized and the client requests that will change the state of the node will be replicated by the receiving node, called the master, to the other nodes, called the peers, of the distributed system. Also, in the following description, Raft is used to perform the replication and PostgreSQL is the example database For database snapshot generation, the approach taken is based on the assumption that the client requests that will change the state of the node will be serialized. The process is triggered by the management to indicate the desire to start the database verification process. When the master node receives the request, it replicates the request to the peer nodes. Because of the serializability property, when a node starts processing the database verification request, all previous update requests would have been completed. So, no further database update belonging to request prior to the current verification request would happen while this request is being processed. A snapshot of the database is taken. For example, pg_dump is a utility for backing up a PostgreSQL database. It makes consistent backups even if the database is being used concurrently. pg_dump does not block other users accessing the database (readers or writers).

For database difference detection, once the database snapshot is generated, it can be copied to an offline machine for further processing to avoid overloading the node in the system. On the offline machine, the database system, for example, PostgreSQL, is run with the database snapshot generated on each node. It can then be used to generate a .csv file for each table in the database in sorted order. After .csv files are generated for each node in the system. Another offline tool can be used to compare .csv file for each table in the database for each peer node with the master node to check for discrepancies. Depending on the request, some fields in the table in peer and master nodes are different inherently. For example, modification time the request is processed is inherently different. To avoid false alarm due to the difference in such fields, the comparison tool needs to have the ability to skip checking such fields, i.e., the comparison is only on fields which should be the same on all nodes.

Active-Active CA Cluster (HCA) Algorithm

The foregoing describes an Active-Active CA cluster (HCA) process. The HCA process is modeled after the Raft algorithm. The following terminology is used herein.

HCA—Active-Active CA cluster process for replication

Master (MCA)—the master of the cluster that will receive all updates. The master can also have additional responsibilities such as LDAP synchronization, authentication key generation, etc. The master is equivalent to the leader in Raft, and these terms are used interchangeably herein. In the cloud-based system 100, the master can be one of the central authorities 106.

Peer (PCA)—The peer can also be one of the central authorities 106 and the peer in the cluster accepts requests from the cloud nodes 102. That is, the bulk of the load on the central authorities 106 is due to the cloud nodes 102. The peer is equivalent to a follower in Raft and the terms peer and follower are used interchangeably herein.

Update_Index—Each update or a state change is tagged with an ID. This is called an Update Index. On any update, the last update index is persisted to storage and is called lastAppliedIndex.

Term—the current incarnation number for the cluster. Each CA 106 selects a monotonically increasing number as the term and takes part in the election. The winner's term becomes the current term of the entire cluster. If the winning MCA dies, a re-election ensues with CA's choosing their next higher term.

Replication Object (RO)—Each update represented as a self-contained replication object. Each RO contains the cluster parameters at that time with the replication payload.

AppendEntries (APE)—MCA of the cluster sends a periodic keep-alive to all peers. This message is called AppendEntries. When there is replication to be performed, the APE message is sent with the RO as the payload. When there is no data to replicate, the APE message sends a 0-byte payload which serves as a pure keep-alive.

Master-Peer Roles

In the cloud-based system 100, each cloud node 102 can resolve to a closest, healthy central authority 106. Each cloud node 102 can resolve to the current master using a designated address, e.g., master.cloudsystem.net. The cloud nodes 102 can initiate various operations to the central authorities 106 which require database updates, e.g., logout, password change, Security Assertion Markup Language (SAML), etc. A database update cannot be done at the peer; thus, there is a bridging module used for these tasks with the objective of minimizing the bridge-required operations. The peer will not perform some central authority tasks, such as key generation, LDAP synchronization, etc.; these tasks are performed by the master. Also, the peer will only accept connections from specific cloud nodes 102. The master can accept connections from any cloud node 102, from the log nodes 108, and the like, i.e., any node in the cloud-based system 100. The master can distribute cloud health to all peers so that all of the central authorities 106 have a copy of all service health statistics.

In the HCA process, all central authorities 106 (nodes) know their system ID, their peer's system ID, and associated IP addresses. The cloud-based system 100 can include a Cluster Manager (CM) which maintains all of this information. The HCA process can be achieved by two modules, namely a Raft library module and an HCA module. The Raft module can be referred to as "libsmraft" which is a Raft library that is reusable and application agnostic. Any application (such as the central authorities 106) that requires an election and state/data replication can use the libsmraft library via the exposed Application Programming Interfaces (API's). Applications initialize the library and provide information about the cluster and its members. The library decides what quorum requirements to impose for the given cluster size. If the application desires election, the library will perform election via Raft messages. Messaging is performed via callbacks defined by the application. The library itself is not network aware (meaning, it does not care how the messages are delivered. It could be via Transmission Control Protocol (TCP), User Datagram Protocol (UDP), SHM, etc.). The Raft messages are opaque to the application. libsmraft uses callback events to inform the application of key decisions. Some of the key decisions are master/peer state changes, approval to proceed with updates, cluster quorum loss, state corruption/full dump trigger, etc.

The second module is the HC module which is a consumer of the libsmraft library. The HC module connects to the cluster members and waits for events from the libsmraft library. When there is an update to be done, the payload is provided to libsmraft. Libsmraft performs its replication and informs application when it is safe to apply the updates, i.e., the entry is replicated on the majority of peers. When phase 1 of Raft is complete, the logs are considered "committed" and when the state machine changes are performed, the logs are considered" applied. The application proceeds with an update on the master. Raft also informs the peers to proceed with the update. Whenever a quorum is not available for an update, the Raft gives up replication and proceeds to bring the cluster down, triggering a re-election for a new master.

On startup, each central authority 106 connects to the cluster manager to download the cluster configuration. If a connection cannot be established for a timeout amount of time, the central authority 106 can reuse any previous cluster information. With the cluster information, all central authorities 106 connect to each other to form an all-to-all connected network. To ensure a single connection between every pair of central authorities, some rules are implemented such as restricting a central authority 106 from only connecting to other central authorities 106 with a system ID greater than its own and expecting connections from central authorities 106 with a system ID less than its own (or vice versa).

Election

Figure 6:
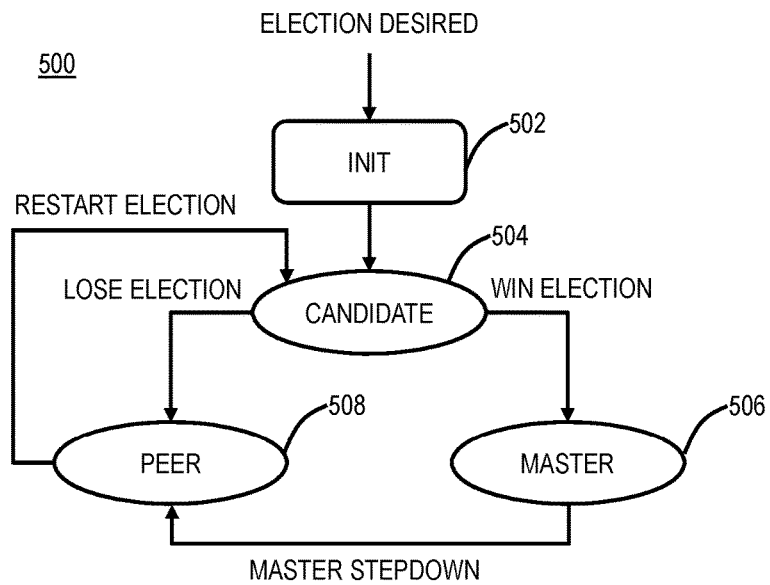
FIG. 6 is a diagram of an election process.

FIG. 6 is a diagram of an election process 500. Again, on startup, all central authorities 106 connect to their peers and establish the all-to-all network ("cluster") and each central authority 106 starts in an INIT state (initial) 502. In the INIT state 502, the central authority 106 reads its existing database completely, starts services, and initialize an election via the election process 500. The central authority 106 can initialize and (the Raft library) by providing information about itself and its peers. The central authority 502 can provide its desired role (master/peer or election), and the cluster waits. If an election is desired, the election process 500 includes the central authority 106 becoming a candidate 504. The central authority 106 will either win the election and become a master 506 or lose the election and become a peer 508. As the master 506, the central authority 106 can step down and become the peer 508. As the peer 508, the central authority 106 can restart the election and become the candidate 504.

The election process 500 can be implemented by an application agnostic library that can be used by any other application requiring state replication and leader election. At startup, the central authority 106 initializes the Raft library by providing a list of cluster members. Also, the central authority can provide a shared memory address to persists logs. The Raft library initializes the cluster with the appropriate roles. If no role was specified, the Raft library will trigger the election process 500. After the election, the Raft library will inform the application of its decision. During this time, the central authority 106 will remain in either the INIT stare 502 or the candidate 504 state.

On initialization, the Raft library reads in three parameters ("Raft parameters") from a persisted metadata file—lastAppliedIndex, term, and votedFor. The lastAppliedIndex is the index of the last replication that was successfully applied (database or state change). The term is the current term of the cluster; the term can only go up and can never be re-used, and the term indicates the incarnation of the cluster. The votedFor is the ID of the last master voted for by the central authority 106. This is persisted to avoid a situation of changing who was voted for in this term. (e.g., a central authority 106 voted for Machine A to be a master in term 10 and the central authority 106 crashed/re-connected and got a vote request from Machine B for term 10. Since the central authority 106 already voted for Machine A, the central authority 106 cannot change its vote to Machine B as it can lead to dual masterships). The Raft parameters can be persisted by the Raft library. Additional parameters include i) commitIndex which is the last index that is known to be replicated on the majority and safe for applications to commit, ii) .lastLogTerm which is the term of the last log entry in the Raft library; and iii) lastLogIndex which is the index of the last log entry in Raft library. The (term, lastLogTerm, lastLogIndex) triplet can be referred to as Raft Keys.

If the election is not desired, the application will indicate to the Raft library the pre-determined roles and the Raft library will not attempt to perform any election and will always fall back to the fixed roles provided. If the election is desired, all cluster members enter the INIT state 502 and start as the candidate 504. The candidates 504 expect an APE message if the master 506 is already present in the cluster. All the candidates 504 start a random election timer to expire between electionTimeout seconds. If a candidate 504 receives an APE message in this time about a master 506, it becomes a follower/peer 508 immediately.

On the election timeout expiry, the cluster member becomes a candidate 504 and informs the application as well. The cluster member proceeds to send the Raft Keys to all peers. The peers receive the vote request and proceed to respond according to the Raft protocol. Two outcomes can occur—i) the peer 508 marks this system ID as votedFor (persisted) and sends the positive vote and ii) the peer 508 rejects the vote and sends the negative vote.

The cluster member that requested the votes processes the responses. If a peer has granted a vote, it counts this vote against the quorum. If there is a quorum, the cluster member initializes itself as a leader/master 506. If peers have rejected the vote, it just increments a counter and moves on. The random election timer continues to run until a decision is made. The Raft protocol guarantees that due to the randomness of the election timer, the election process 500 will eventually converge and the right master 506 will be elected. Once the master 506 is elected, the Raft library informs the application of the decision. At this time, the central authority will take up the role of the master 506. The master 506 informs its leadership to the peers 508 by sending the heartbeat APE message and the peers 508 will take up the role of the peer 508.

Master and Peer State Machine

A central authority 106 learns that it is the master 506 from the Raft library. This can be either via election or via a forced role. Once the central authority 106 learns it is the master 506, the following steps are performed for database state replication. First, the central authority 106 reads the cluster information and status. This is required as these tables are not always "software state" replicated correctly. The central authority 106 generates configurations for connectivity (IP address, etc.) and the master 506 is ready to accept connections from everyone. The Raft library will start using the callbacks to periodically send the APE message to the peers 508. Other central authorities learn they are the peer 508 from the Raft library and read the cluster information and status, accept connections from the cloud nodes 502, and reject connections from any other nodes other than the cloud nodes 502.

Replication Design

Figure 7:
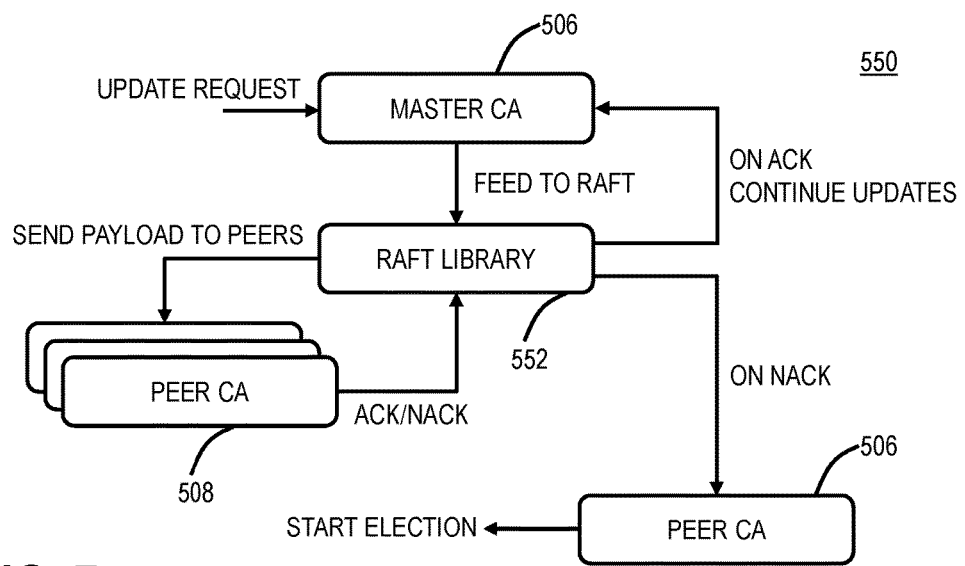
FIG. 7 is a diagram of replication between the master and the peers.

FIG. 7 is a diagram of replication 550 between the master 506 and the peers 508. The master 506 receives an update request, such as from a client (User Interface (UI), internal operation, peer bridging) to perform an update. The update could be a database update or a software state update. For example, a UI Structured Query Language (SQL) update is a database update that has to be done by all central authorities 106 to ensure database synchronization. Also, a change in cloud operations such as activating a new customer, etc. is a software state update that has to be done by all central authorities 106 to ensure the same policy and configuration is seen by all central authorities 106.

The master 506 uses Raft APIs to create a Replication Object (RO) out of the update request. An RO is a self-contained payload that contains (Raft Keys, commitIndex, Payload). The RO is fed to a Raft library 552 for replication. The Raft library 552 assigns a new index for this RO and sends the RO to all the peers 508 in an AppendEntries (APE) message. The payload is opaque to the Raft library 552 itself.

The peers 508 receive the RO and decide to accept or reject the RO based on its current Raft Keys. The peers 508 will reply back to the master 508 with their decision (Yes/No—ACK/NACK). If the master 506 gets a majority "Yes," the master 506 goes ahead and informs the application to make the update by updating its commitIndex. It also informs the peers 508 about the new commitIndex in its next APE message. After performing the update, the application informs the Raft library 552 that the changes are applied. The Raft library 552 updates the lastAppliedIndex to persistent storage and moves on to next update.

If the master 506 does not get a majority "Yes" within phase1Timeout seconds, the master 506 will relinquish mastership and start the election process 500. As a part of relinquishment, the master 506 will wait for relinquishWait-Seconds for running requests to be retired. Any request that has been created but has not received majority acknowledgments for commit is marked as canceled and moved to a leaked queue.

Application Replication

Figure 8:
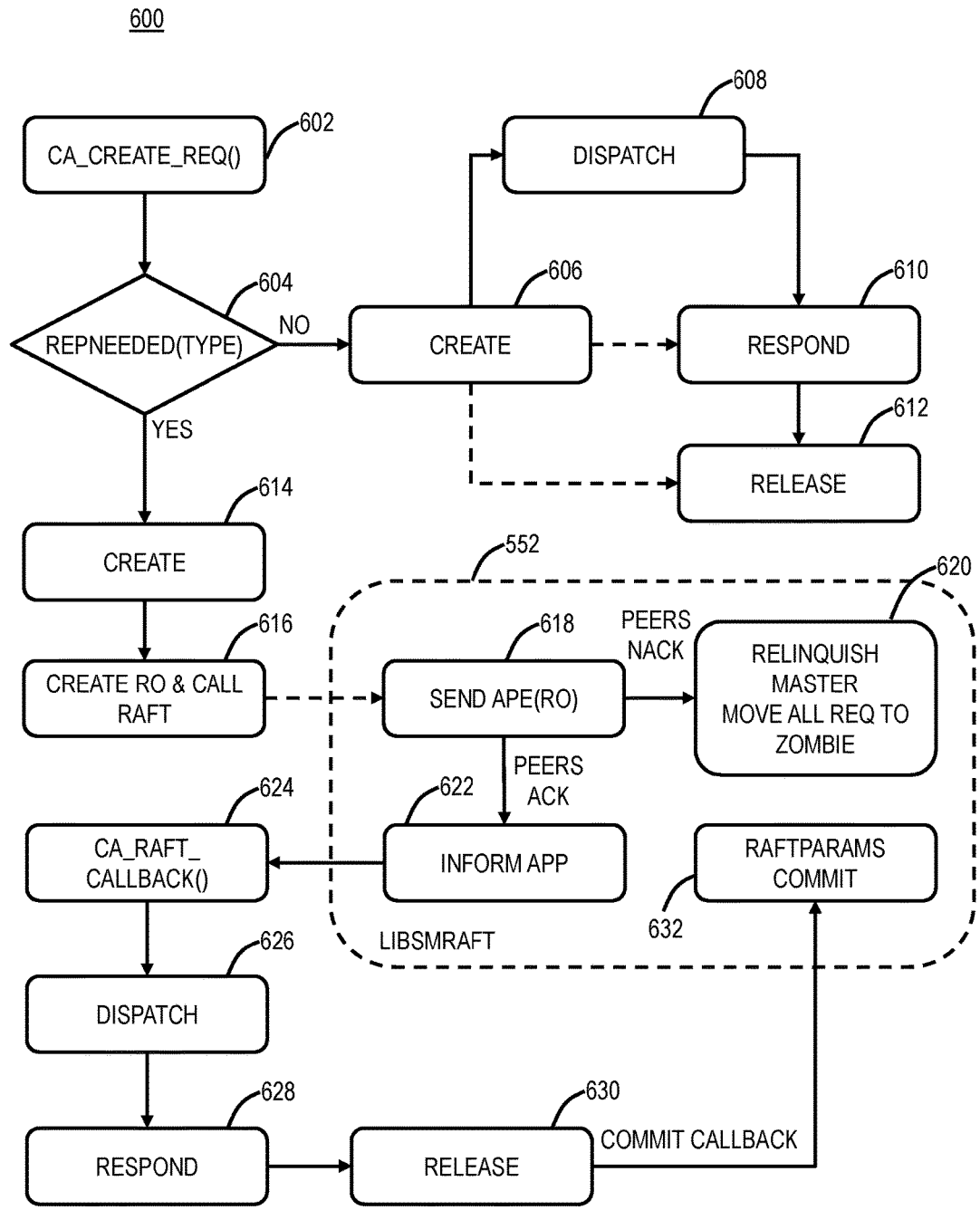
FIG. 8 is a flowchart of an application replication process.

FIG. 8 is a flowchart of an application replication process 600. The application replication process 600 includes one of the cloud nodes 502 or the log nodes 508 wanting to replicate a database update or software state change to the central authorities 506. A request is received at the master 506, and a REQ is created (step 602). If the request type does not need replication (step 604), the REQ is handled in a normal lifecycle including create (step 606), dispatch (step 608), respond (step 610), and release (step 612).

If the request type does need replication (step 604), the application creates a replication object using the Raft library API (steps 614-616). The Raft library 552 queues this replication object for replication. A Raft timer triggers sending of the replication object via APE messages (step 618). If the peers NACK, the master relinquishes and the REQ is moved to a zombie (step 620). If the peers ACK, the peers receive the payload and feed to the Raft library (step 622). Once the master has applied the update, Raft timers on the peer trigger application callbacks (step 624). The same payload causes the REQ creation and dispatch on the peers (steps 626-632). The REQ logic on the master and peer is identical. This ensures software state and database are both replicated.

Master/Peer Raft-Application Interaction

Figure 9:
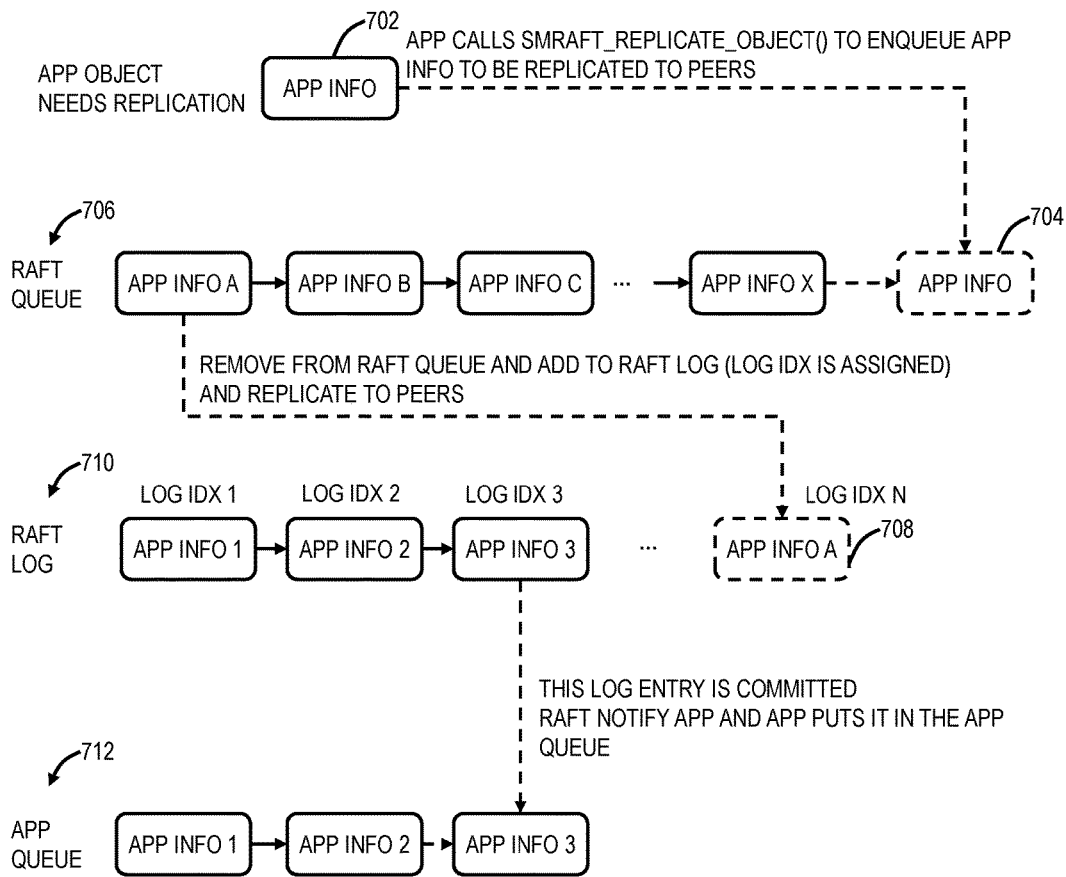
FIG. 9 is a diagram of a Raft-application interaction process on the master.
Figure 10:
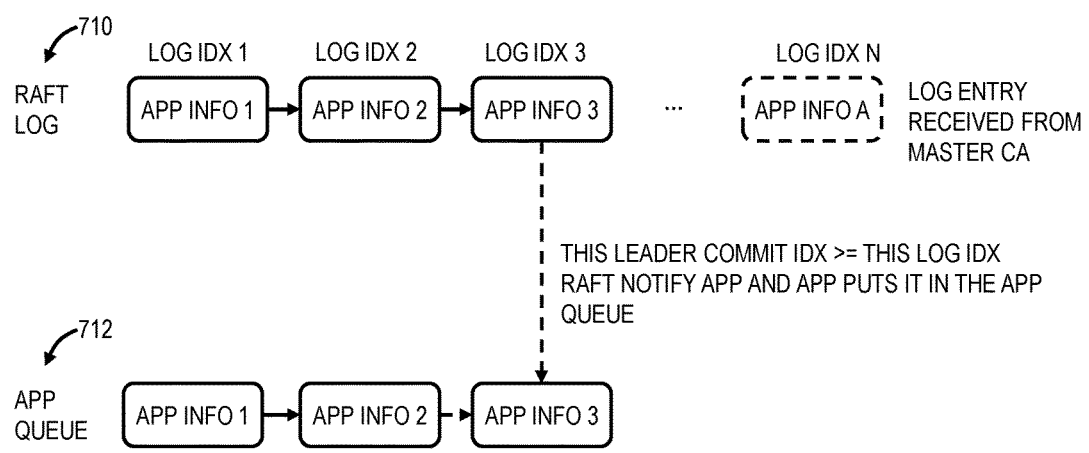
FIG. 10 is a diagram of a Raft-application interaction process on the peer.

FIG. 9 is a diagram of a Raft-application interaction process 700 on the master 506. FIG. 10 is a diagram of a Raft-application interaction process 750 on the peer 508. In FIG. 9, the app object needs replication, app info (step 702). The app calls (SMRAFT_REPLICATE_OBJECT( )) to enqueue the app info to be replicated to the peers (step 704). The app info is placed in a Raft queue 706. For example, app info A can be removed from the Raft queue 706 and is added to a Raft log 710 (log index is assigned) and replicated to the peers (step 708). App info 3 can be committed from the Raft log 710 to an app queue 712 and Raft notifies the app.

In the cloud-based system 100, in an exemplary embodiment, only the cloud nodes 102 are allowed to connect to the peers 508. For example, the cloud-based system 100 can be a distributed security system and most requests from the cloud nodes 102 are read-only which can be satisfied by the peers 508. A few cloud node 102 flows can require database/state updates. Since Raft require all updates to be redirected to the master 508, a bridging module can be implemented on the peers 508 that bridges any update that land on the peer 508 to the master 506.

Full Dump

A central authority 106 can request a full dump from the master 506. In this process, several steps happen on either side. On the requested central authority 106 (typically the master can be extended to take the full dump from a healthy peer in the future), the full dump file is first generated, the file is then transmitted to the requesting central authority 106. On the requesting central authority 106, the received full dump file is applied. The full dump may be needed in three example cases—

First—recovery of a bad sequence on the peer 508. For any reason, if a database sequence goes out of sync, the peer 508 will request a full dump automatically. The sequence failures are fully logged for investigation (as the protocol mostly ensures the sequences cannot go out of sync).

Second—If a dead peer 508 comes back after a long downtime, the master 506 may not have the old Raft logs. In this case, the master 506 will request peer to request for a full dump.

Third—any manual/forced recovery cases.

The full dump file can be generated while Postgres is running. It uses the Postgres functions pg_start_backup( ) and pg_stop_backup( ) to mark the beginning and end of the backup. It uses the Point-In-Time Recovery feature of Postgres.

Figure 11:
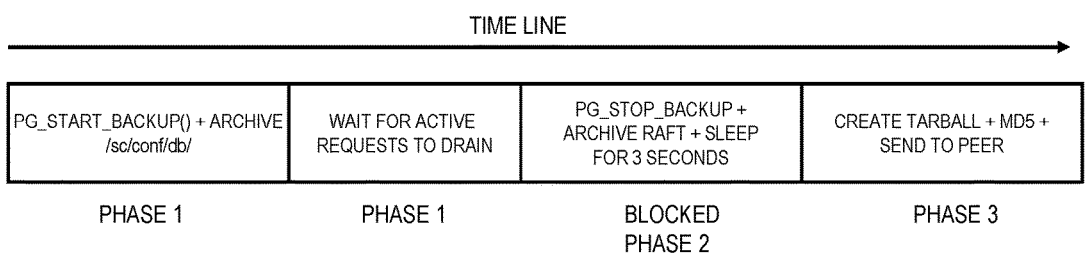
FIG. 11 is a diagram of the phases of a full dump file generation.

FIG. 11 is a diagram of the phases of a full dump file generation process. The full dump file generation process includes calling pg_start_backup( ) to mark the beginning of the backup. The entire database directories are archived in a file. When the above is done, new replication objects will stop dequeuing. The central authority 106 waits until all replication objects that were started while database directories were being archived to complete. When that happens, the central authority 106 proceeds to phase 2.

The central authority 106 calls pg_stop_backup( ) to mark the end of the backup process. As Postgres was running during backup, additional updates that happened during this period were archived in the archive directory. In this phase, this delta archive is added and additional application information that is needed for the full dump to complete. Postgres is configured to store transaction logs in a configurable archive directory. The delta during phase 1 is already in the archive directory. This archive was emptied when phase 1 was started. Fields like last_value and is_called from all sequence tables in Postgres are also saved. Application related info like Raft log entries and raft metadata file are saved.

All the information saved above is added to the original archive file in phase 1. To restore the state, Postgres requires that the restore time to be later than the pg_stop_backup( ) time. So, phase 2 waits a few seconds before returning to ensure this. Note that, during phase 2, the central authority 106 does not process any new replication objects. It is guaranteed that no new state update happens during these few additional seconds.

When phase 2 is done, the central authority 106 resumes processing new replication objects, and phase 3 is started. During phase 2, the central authority 106 will pause all update processing. This will be a fairly short duration. In phase 3, the above-archived file is compressed, and a checksum is generated for the verification. When all 3 phases are done, the requested central authority 106 will send the file and the checksum info to the requesting central authority 106.

By default, a new full dump file is generated every time a full dump request is processed. There are feature parameters which, if configured, are used by the central authority 106 decide whether a previously generated full dump file is still not old and can be reused. The feature parameters are called smhca_julldump_file_rep_obj_id_tolerance and smhca_fulldump_file_ts_tolerance. The former is the max difference in rep_obj_id between the previous full dump and the current request while the latter is the max time difference between the previous full dump Timestamp and the current request Time.

After verifying archived file sent by the requested central authority 106, the requesting central authority 106 starts to apply the full dump. Several steps are involved in this process. The central authority 106 will write the installed dir, DB name and environment variable to a file, called hca_fulldump_app_cmd. A background script, called hca_fulldump_app_server.sh, checks for the presence of such command file and will call another script, called hca_fulldump_app.sh, to apply the full dump when it detects the command file.

The script that applies the full dump does the following Stop ca, Stop Postgres, Extract the files from received dump tarball, Copy Raft metadata file to its known location, Rebuild Raft log entries, Create a Postgres recovery.conf file that specifies the recovery time as "pg_stop_backup( ) time+1 second," Start Postgres, and start ca. At this point, the requesting central authority 106 should run with the database matching that of the requested central authority 106 at the time the full dump was generated.

Database Comparison

The consistency of the database in the master 506 and the peers 508 is verified using the process 450. This includes obtaining a snapshot of the database on each of the central authorities 106, such as using the following Command Line Interface (CLI) command on the master—smmgr.sh -ys setcainfo=hca_fulldump_file_rep. The process 450 can use an offline tool, called hca_load_db_gen_table.py, to load the database snapshot to a machine and export tables and sequences to .csv files. The process 450 can use yet another offline tool, called hca_compare_db_table.py, to compare tables and sequences generated for each of the peer central authorities 106 with that of the master 506.

The database snapshot is taken on each central authority 106 using the mechanism similar to that in the full dump generation section. It finishes when the backup file is generated. In order the ensure that the database snapshot is taken on each of the central authorities 106 went through the same set database update operations, the request is issued as a replication object. The CLI command "smmgr.sh -ys setcainfo=hca_fulldump_file_rep" will cause the SMCA_HCA_FULLDUMP_FILE_GEN_REP intapp to be generated and which is replicated on the peer central authorities 106.

Since some field(s) in some of the the intapp update operations may result in different values on different central authorities 106 (e.g., the timestamp value is set when the intapp is being processed at CA), a file called hca_compare_db_skip.conf is used to specify what fields to skip for each of the tables. Since sequences have the same set of skip fields, they are hardcoded in the compare script.

Sequence Validation

Figure 12:
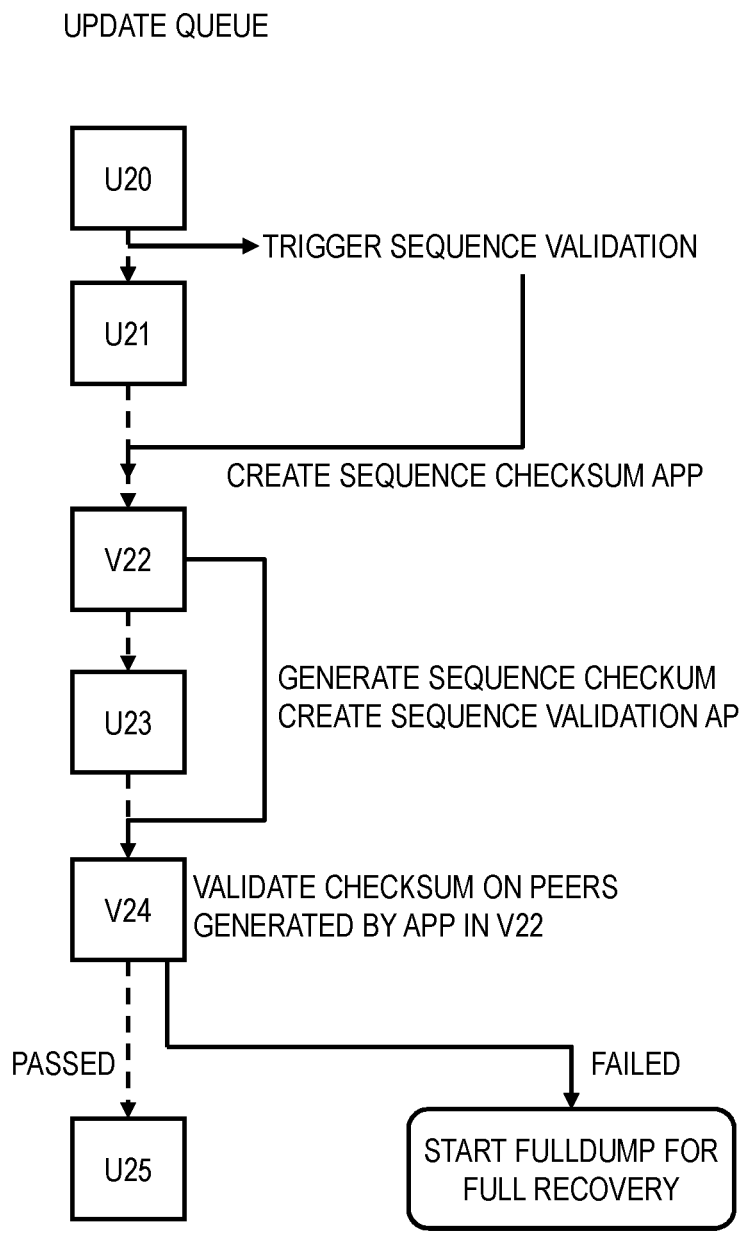
FIG. 12 is a diagram of an example sequence validation.

FIG. 12 is a diagram of an example sequence validation illustrating exemplary operations of the various techniques described herein.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of replication and validation between a plurality of nodes in a cloud-based system forming a cluster, the method comprising:

replicating a database and a software state between the plurality of nodes utilizing a replication algorithm which elects a master of the plurality of nodes and remaining nodes as peers, wherein the master is configured to perform the replicating;

validating database sequences in the database at all of the plurality of nodes utilizing the replication algorithm to ensure sequential order of the validating between the plurality of nodes;

responsive to differences between a peer and the master, performing a failure recovery in the database at the peer; and verifying the database of the peer and the master utilizing the replication algorithm without closing an application interacting with the database and honoring requests from the application to the database during the verifying, wherein the verifying is performed through a replication operation using the replication algorithm to perform a database dump which is verified offline with a tool for comparison, wherein the comparison omits one or more fields in the database between the peer and the master, wherein the one or more fields are inherently different.

2. The method of claim 1, wherein the validating is performed after each database update.

3. The method of claim 1, wherein the validating comprises:

causing each node to determine a checksum of all sequence values by the master;

providing the master's checksum to each node via the replication algorithm; and comparing the master's checksum with a local checksum at each node.

4. The method of claim 1, wherein the validating is performed through commands in the replication algorithm ensuring a sequential order of operations.

5. The method of claim 1, wherein the failure recovery comprises obtaining a full dump from the master.

6. The method of claim 1, wherein the replication algorithm comprises Raft.

7. A cloud-based system configured for replication and validation between a plurality of nodes in a cluster, the cloud-based system comprising:

a plurality of nodes each configured to replicate a database and a software state between one another utilizing a replication algorithm which elects a master of the plurality of nodes and remaining nodes as peers, wherein the master is configured to perform replication;

wherein each of the plurality of nodes is configured to validate database sequences utilizing the replication algorithm to ensure sequential order of the validation between the plurality of nodes, and wherein, responsive to differences between a peer and the master in the validation, a failure recovery is performed for the database at the peer, wherein the database of the peer and the master are verified utilizing the replication algorithm without closing an application interacting with the database and while honoring requests from the application to the database during the verification, wherein the verification is performed through a replication operation using the replication algorithm to perform a database dump which is verified offline with a tool for comparison, and wherein the comparison omits one or more fields in the database between the peer and the master, wherein the one or more fields are inherently different.

8. The cloud-based system of claim 7, wherein the validation is performed after each database update.

9. The cloud-based system of claim 7, wherein the validation comprises:
- a determination of a checksum of all sequence values at each node;
- each node obtaining the master's checksum via the replication algorithm; and
- each node comparing the master's checksum with a local checksum.

10. The cloud-based system of claim 7, wherein the validation is performed through commands in the replication algorithm ensuring a sequential order of operations.

11. The cloud-based system of claim 7, wherein the failure recovery comprises obtaining a full dump from the master.

12. The cloud-based system of claim 7, wherein the replication algorithm comprises Raft.

13. A non-transitory computer-readable medium comprising instructions that, when executed, cause a processor to perform steps of:
- replicating a database and a software state between the plurality of nodes utilizing a replication algorithm which elects a master of the plurality of nodes and remaining nodes as peers, wherein the master is configured to perform the replicating;
- validating database sequences in the database at all of the plurality of nodes utilizing the replication algorithm to ensure sequential order of the validating between the plurality of nodes;
- responsive to differences between a peer and the master, performing a failure recovery in the database at the peer; and
- verifying the database of the peer and the master utilizing the replication algorithm without closing an application interacting with the database and honoring requests from the application to the database during the verifying, wherein the verifying is performed through a replication operation using the replication algorithm to perform a database dump which is verified offline with a tool for comparison, wherein the comparison omits one or more fields in the database between the peer and the master, wherein the one or more fields are inherently different.

14. The non-transitory computer-readable medium of claim 13, wherein the validating is performed after each database update.

15. The non-transitory computer-readable medium of claim 13, wherein the validating comprises:
- causing each node to determine a checksum of all sequence values by the master;
- providing the master's checksum to each node via the replication algorithm; and
- comparing the master's checksum with a local checksum at each node.

16. The non-transitory computer-readable medium of claim 13, wherein the validating is performed through commands in the replication algorithm ensuring a sequential order of operations.

17. The non-transitory computer-readable medium of claim 13, wherein the failure recovery comprises obtaining a full dump from the master.

18. The non-transitory computer-readable medium of claim 13, wherein the replication algorithm comprises Raft.

* * * * *